United States Patent
Luft et al.

(10) Patent No.: US 7,017,949 B2
(45) Date of Patent: Mar. 28, 2006

(54) FLEXIBLE CORRUGATED HOSE FITTING

(75) Inventors: Thomas Luft, Karlsruhe (DE); Axel Schneider, Sinzheim (DE); Michael Markus Huck, Bühlertal (DE); Harald Twardawski, Rastatt (DE)

(73) Assignee: Eaton Fluid Power GmbH, Baden Baden (DE)

( * ) Notice: Subject to any disclaimer, the term of this patent is extended or adjusted under 35 U.S.C. 154(b) by 13 days.

(21) Appl. No.: 10/470,672

(22) PCT Filed: Jan. 14, 2002

(86) PCT No.: PCT/EP02/00284

§ 371 (c)(1),
(2), (4) Date: Dec. 18, 2003

(87) PCT Pub. No.: WO02/061322

PCT Pub. Date: Aug. 8, 2002

(65) Prior Publication Data

US 2004/0094953 A1 May 20, 2004

(30) Foreign Application Priority Data

Feb. 1, 2001 (DE) ................. 101 04 449

(51) Int. Cl.
*F16L 47/00* (2006.01)
(52) U.S. Cl. .................. 285/256; 285/903; 285/257; 285/222.1; 29/890.14
(58) Field of Classification Search ............... 285/903, 285/241, 256, 222.1–222.5, 322, 257; 29/890.14
See application file for complete search history.

(56) References Cited

U.S. PATENT DOCUMENTS 2,309,719 A * 1/1943 Vaill ................. 285/222.5
2,797,111 A * 6/1957 Beazley ................ 285/222.4

(Continued)

FOREIGN PATENT DOCUMENTS

EP     0 057 920 A1    8/1982

(Continued)

OTHER PUBLICATIONS

Derwent English Abstract for FR 2 769 350 A1.

*Primary Examiner*—David Bochna
(74) *Attorney, Agent, or Firm*—Honigman Miller Schwartz and Cohn LLP (57) ABSTRACT

A flexible corrugated hose fitting, which is particularly provided for high-pressure installations, such as air conditioning installations using CO2 as the refrigerant, has a connecting element, which can be snapped together with the interior corrugated pipe of the flexible corrugated hose. In addition, the connecting element has sealing elements, which come into sealing contact with the corrugated pipe. Following the area receiving the sealing elements, the connecting element has a cone, which is used as a clamping section. An exterior squeeze ring, or other squeeze element, is used for pressing the exposed end of the corrugated pipe against the clamping section. A pressing sleeve is used for pressing, which drives the squeeze ring by a wedge effect inward. It has an appropriate conical interior surface. The squeeze ring moreover extends over the sheathing. For further securing of the connection, the pressing sleeve can be pressed together here with the sheathing by an appropriate deformation. The pressing sleeve can alternatively be provided with an interior thread in this area, which cuts into the sheathing.

20 Claims, 5 Drawing Sheets

U.S. PATENT DOCUMENTS 2,848,254 A * 8/1958 Millar .................... 285/222.5
2,858,147 A * 10/1958 Guarnaschelli .......... 285/222.5
3,140,106 A * 7/1964 Thomas et al. .......... 285/222.4
3,237,974 A * 3/1966 Press ....................... 285/222.4
4,805,942 A * 2/1989 Goodridge ............... 285/222.1

FOREIGN PATENT DOCUMENTS

| FR | 2 769 350 A1 | 4/1999 | |
|---|---|---|---|
| GB | 564515 | 10/1944 | |
| GB | 2 000 840 A | 1/1979 | |
| JP | 6109179 | * 4/1994 | ................ 285/903 |

* cited by examiner

FLEXIBLE CORRUGATED HOSE FITTING

BACKGROUND OF THE INVENTION

1. Field of the Invention

The invention relates to a flexible corrugated hose fitting, in particular for flexible corrugated hoses having a corrugated pipe and a sheathing, for example of an elastomer, in particular for use in pressure-carrying systems.

2. Description of the Related Art

At times, flexible lines, which are provided by means of special hoses, are required in fluid-conducting systems. For example, such hoses are flexible corrugated hoses, such as are used for higher pressures. Flexible corrugated hoses have a corrugated pipe which is flexibly bendable because of its shape and encloses a fluid channel. The corrugated pipe is provided with a sheathing on its exterior, for example made of an elastomer. The sheathing can be reinforced by means of textile materials or a wire mesh.

The introduction of such flexible corrugated hoses into pressure-carrying systems is not without problems, in particular if large mechanical stresses and/or large stresses due to pressure must be expected and a great amount of imperviousness is required. Welded connections between other types of lines and the corrugated pipe also always involve a thermal stress of the surroundings, which can lead to partial damages of the flexible corrugated hose. Moreover, welded connections can only be made with a considerable outlay in apparatus.

Occasionally the problem arises of having to provide flexible corrugated hoses in lengths in accordance with their intended use. If the connection cannot be made by the user himself at the site, he has no choice but to have flexible corrugated hoses of the desired length, which are provided with appropriate connecting elements, supplied to him. This applies in particular to flexible corrugated hoses which are provided with connecting elements which cannot be connected to the flexible corrugated hose without special equipment.

The attachment of connection fittings to flexible corrugated hoses requires special attention, in particular if they are designed for bursting pressures of several hundred bar, for example. Such flexible corrugated hoses are employed, for example, in connection with vehicle airconditioning systems, which utilize $CO_2$ as the refrigerant. Under bending stress, the heavy sheathing provided results in high tensile stress between the sheathing and the connection fittings. Such tensile stresses must not be allowed to result in damage to the connection.

Based on the foregoing, a need exists for fittings for a flexible corrugated hose, which can be readily connected to flexible corrugated hoses and in the process allow the production of permanently impervious connecting elements by means of a reliable process.

SUMMARY OF THE INVENTION

By means of the flexible corrugated hose fittings according to the present invention, it is possible to prepare a free end of a flexible corrugated hose in a pressure-proof and permanently sealed manner for connection with further devices. The hose lengths which can be produced here can be set depending on the requirements and independently of production-related hose lengths. The flexible corrugated hose fittings allow the retroactive connection to the open end of a flexible corrugated hose without soldering and welding operations and by simple technical means, which can be made available by the user. Therefore, when installing flexible corrugated hoses into its fluid-conducting systems, the user does not have to rely on having to buy ready-made flexible corrugates hoses from the manufacturer, but he can also fall back on endless material and can cut the flexible corrugated hoses to size as needed. This allows the particular option of the usage in small and very small series. Further than that, an efficient process is made possible, even with industrial scale manufacture.

The flexible corrugated hose fitting according to an embodiment of the present invention, has a connecting element with an extension, which is pushed into the corrugated pipe and which secures the connecting element interlockingly in the corrugated pipe. The securing means provided on the extension utilize the interior shape of the corrugated pipe for the interlocking securing. A connection of tensile strength, which can be greatly stressed in the axial direction, between the connecting element and the corrugated pipe is created by means of this, so that fluid pressures acting in the corrugated pipe cannot result in the release of the connection.

A clamping section provided on the connecting element is used for further fastening and sealing, against which the open end of the corrugated pipe is radially inwardly pressed. This takes place by means of a clamping element, over the outside of which a pressing sleeve extends. The pressing sleeve extends from the connecting element over the clamping element to the sheathing and receives the end of the sheathing on its inside. In the course of pushing the pressing sleeve on the clamping element, the clamping sleeve causes the clamping in place of the end of the corrugated pipe. For the final securing of the connection, the pressing sleeve is radially inwardly deformed, for example in the area of an annular bead or at individual discrete locations. Thus, the end of the flexible corrugated hose is radially clamped in this area between the pressing sleeve and the extension and clamped into place in this way.

Connections made in this way are permanently fluid-tight and pressure-resistant.

With an advantageous embodiment, the extension of the connecting element is embodied to be pipe-shaped and has an essentially cylindrical exterior surface. This provides the extension with great stability which is of importance, in particular in view of producing the pressure connection between the pressing sleeve and the flexible corrugated hose.

The extension forms an abutment, so to speak, for the force exerted on the hose end in the course of the pressing process.

The fastening element which is used for the axial securing of the end of the flexible corrugated hose at, or on the connecting element, is preferably designed as a snap-in device which, although it permits the insertion of the extension into the open hose end, prevents it from being pulled out of the hose end. In connection with an advantageous embodiment, one or several snap-in protrusions extending in the radial direction away from the extension are a part of the snap-in device. If several of such snap-in protrusions are provided at an axial distance from each other, they have the same spacing as the individual ribs of the corrugated pipe. In this way the axial force acting between the connecting element and the hose end because of outside mechanical actions or because of the interior pressure of the fluid in the corrugated pipe is transferred, distributed over several ribs of the corrugated pipe, to the hose end, so that a deformation of the corrugated pipe end caused by the action of the tensile force, or the pressure, can be prevented. The flexible corrugated hose fitting under discussion is therefore particularly suited for high interior pressures, and also large mechanical stresses.

In an advantageous embodiment, ring-shaped snap-in ribs can be employed as the snap-in protrusions in order to distribute the generated axial forces evenly over the entire circumference of the corrugated pipe. This is also advantageous for the stability of the connection.

To improve the sealing, and in particular for causing absolute fluid-tightness, as can be required in the course of the employment of hermetically sealed fluid systems, in particular high-pressure systems, it is advantageous if the flexible corrugated hose fittings have one or several sealing elements, which can be made, for example, of an elastomer. O-rings are suitable as elastomer elements, for example. In this context it has been shown to be advantageous to provide one or several annular grooves in the extension of the clamping element, which are used for receiving O-rings or other elastomer sealing elements. In this case the annular grooves are preferably of such a type that the O-rings come to rest on the ring-shaped, radially inwardly protruding ribs of the corrugated pipe and provide a seal on them. In this case the position of the annular grooves has been preferably selected in such a way that the contact face between the O-ring and the respective rib is located approximately on an exterior cone surface. In this way sealing can take place aided by pressure. Thus the pressure prevailing in the fluid channel of the corrugated pipe presses the O-ring, or other sealing element, against the respective sealing face of the corrugated pipe and in this way increases the sealing effect (active seal).

When using several sealing elements, which are arranged one behind the other in the direction of an imagined leak flow, it is possible to further increase the sealing effect. Regardless of the number of sealing elements, the sealing effect is increased with increased operating pressure—in this way they constitute an "active seal". The sealing elements, which are essentially maintained clamped by means of radially acting forces, can be arranged in such a way that they directly enter into a trough (between two ribs) of the corrugated pipe, or meet a crest (a ring-shaped rib protruding toward the interior) of the corrugated pipe. However, a position between these two extreme values is preferred, wherein they are preferably positioned in such a way that, viewed from the free end of the extension, they directly meet a flank (contact flank), which drops obliquely toward the extension, in the transition between a "trough" and a "crest" of the corrugated pipe.

In addition, the clamping element can be provided with a sealing element, which is clamped by the axial forces. Further sealing is caused by the clamping element pressing the corrugated pipe end against the clamping section of the connecting element. On its outside, the exposed corrugated pipe end also rests sealingly against the inside of the clamping element. By means of this, the following sealing places, or sealing possibilities thus result as a whole:

1. active and optionally double radial sealing between the cylindrical exterior surface of the extension and the interior surface of the corrugated pipe, 2. sealing of the clamping element on the outside of the exposed corrugated pipe end in the form of a combination of a metallic and elastomeric seal by remainders of the sheathing at the corrugated pipe, and sealing between the clamping element and the pressing sleeve, as well as the connecting element, and 3. axial sealing between the front of the sheathing of the flexible corrugated hose and the axially acting sealing element (if provided) of the clamping element in the pressing sleeve.

The mechanical connection between the flexible corrugated hose fitting and the flexible corrugated hose as a whole will be assured as follows:

1. The axial forces created between the shoulder element and the flexible corrugated hose by the interior fluid pressure are absorbed by the interlock between the corrugated pipe and the extension of the shoulder element.

2. Radial forces, which are caused by the interior pressure, are also transmitted by means of a frictional, and therefore interlocking, connection between the corrugated pipe and the shoulder element, and by means of the action of the clamping element and the pressing sleeve, and a sealing point is created for the additional (redundant) assurance of the fluid tightness.

3. By means of the pressure on the pressing sleeve and its deformation it is achieved that the flexible corrugated hose is secured on its exterior circumference in a frictional, form-locking and interlocking manner against an axial extension in the area of the fitting. Therefore the failure of the connection because the flexible corrugated hose slips out of the fitting because of an interior pressure stress, or because of a mechanical action (bending) is therefore prevented to a large extent. Moreover, the pressing of the pressing sleeve against the sheathing causes an additional sealing.

The extension of the connecting element is preferably constituted by a pipe-shaped section, which is slit at the end. At least two, but preferably several, four example four, longitudinal slits are provided. The slits separate resilient fingers of the extension from each other. It is possible by means of the number of the longitudinal slits and their length to set the spring effect, and therefore the force required for inserting the shoulder element, to a desired value.

The clamping section of the shoulder element is preferably constituted by a cone. The clamping element then has a corresponding interior shape. The cone preferably tapers in the direction toward the extension. But the pressing sleeve preferably has an opposite orientation, i.e. its conical interior shape tapers in the direction toward the extension. In this embodiment the clamping element is preferably constituted by a ring with a wedge-shaped longitudinal profile. The clamping element can be made of a deformable material, or provided with longitudinal slits at least in parts, so that it can be pushed radially inward by the action of the pressing sleeve. This makes the solid pressing of the corrugated pipe end against the clamping section of the connecting piece possible.

For the optimization of the pressing effect it has been shown to be useful if the clamping section has a cone angle of not more than 10°. By means of matching the interior shape and the exterior shape of the clamping element to the clamping section of the connecting element, as well as to the pressing sleeve, a planar force transmission and therefore a mechanically solid seating is achieved.

The pressing sleeve which extends over the sheathing is preferably pressed together with the sheathing, or the flexible corrugated hose. The connection by pressure can take place by means of annular beads or other depressions, which have been cut radially in the direction of the interior, such as dot-shaped or strip-shaped depressions. The connection by pressure can take place at one or several axial positions. A planar connection by pressure (a wide strip or an annular strip) is also possible. With a dot-shaped or strip-shaped connection by pressure, the axial pressure points on the pressing sleeve are preferably arranged in such a way that the active line of the force action extends through a crest of the corrugated pipe (rib) of the corrugated pipe where the corrugated pipe rests against the extension. A subsequent and unintended and undefined deformation of the corrugated pipe is prevented by means of this. Here the extension is preferably designed in such a way that it has no slits in the pressure area in order to constitute a solid abutment for the flexible corrugated hose.

BRIEF DESCRIPTION OF THE DRAWINGS

Advantageous details of embodiments of the invention are the subject of the dependent claims and can be taken from the drawings or the description. Exemplary embodiments of the invention are illustrated in the drawings, wherein:

DETAILED DESCRIPTION OF THE INVENTION

Figure 1:
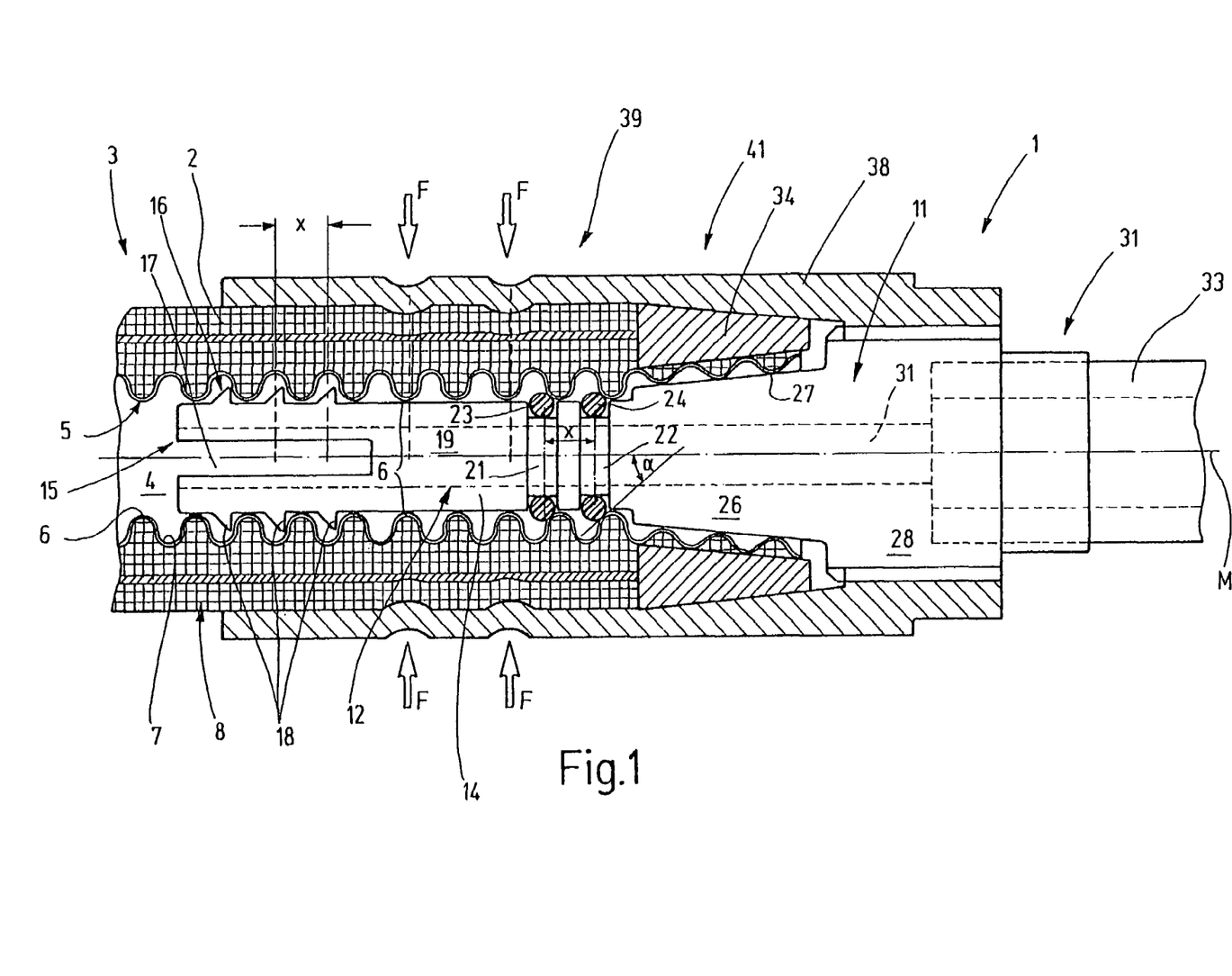
FIG. 1 is a partial cross-sectional view of an end of a flexible corrugated hose provided with a flexible corrugated hose fitting.

A flexible corrugated hose fitting 1 and an end 2 of a flexible corrugated hose 3 are represented in a longitudinal sectional view in FIG. 1. The flexible corrugated hose 3 has a central fluid channel 4, whose walls are constituted by a corrugated pipe 5. The corrugated pipe 5 is embodied in the way of a bellows, wherein the diameter of the corrugated pipe 5 changes in a wave shape along its axial direction. By means of this, inward oriented ribs 6 (narrowing the fluid channel 4) are created on the corrugated pipe 5 and define wave crests, so to speak, wherein a wave trough 7 is formed between two ribs 6. The corrugated pipe is made of a flexible material, special steel, for example, or some other metal. Preferably it is embodied as a welded pipe and therefore has a longitudinal bead, which is not represented in the drawing figures.

A sheathing 8 is seated on the corrugated pipe 5, which is essentially constituted by an elastomeric material, such a caoutchouc, plastic, silicon rubber, or the like. For reinforcing the sheathing 8 it can be provided with an insert 9, for example a wire insert, a wire screen, or the like coaxially to the corrugated pipe 5.

A connecting element 11, which is embodied as a pipe body, is a part of the flexible corrugated hose fitting 1. It has a pipe-shaped extension 12, whose cylindrical exterior surface 14 has an exterior diameter, which corresponds to the interior diameter of the ribs 6 of the corrugated pipe 5, or is slightly less than that. The extension 12 is a one-piece component of the connecting element 11. On its front free end 15 it is designed as a snap-in device 16. For this purpose the extension 12 is provided, starting from its free end 15, with two or more axial slits 17. The areas of the extension 12 remaining between the latter form snap-in fingers.

The outsides of the said snap-in fingers are provided with snap-in protrusions, for example in the form of snap-in ribs 18, which extend in a ring shape around the extension 12, for forming the snap-in device 16. The snap-in ribs are exclusively arranged on the portion of the extension 12 which, by virtue of the axial slits 17, is radially resilient. They have a saw-tooth profile in longitudinal section, whose inclined surface is arranged on the side of the respective snap-in rib 18 located toward the free end 15, and whose radial surface is arranged on the side of the respective snap-in rib 18 facing away from the end 15. The distance x between two adjoining snap-in ribs 18 agrees with the distance of two ribs 6. But it can also be a whole-number multiple of it.

The extension 12 has an unslit area 19 adjoining the axial slits 17, which is used as the support area for a pressure connection, to be explained later, between the end 2 and the flexible corrugated hose fitting 1. A sealing area, which has one or several annular grooves 21, 22, is provided following this area 19. O-rings 23, 24 are seated in these as sealing elements. The O-rings 23, 24 consist of an elastomeric material. The distance between the annular grooves 21, 22 agrees with the distance x, and therefore corresponds to the divisions of the corrugated pipe 5.

Because of the appropriate fixation of the distance between the snap-in ribs 18 and the annular grooves 21, 22, the O-rings 23, 24 rest against a location of the rib 6 which, as represented in FIG. 1, is inclined in respect to the center axis M at an acute angle α opening toward the free end 15 of the extension 12. The angle α advantageously lies in the range between 10° to 70°. In the preferred embodiment it is 45°. This is achieved in that the distance between the annular groove 22 and a rib 18 is a multiple of x plus 0.25 to 0.33 times x (the distance=n*x+b*x; b=0.25 . . . 0.33).

The connecting element 11 has a clamping section 26, which adjoins the extension 12 and, in the present example, is embodied as a cone or truncated cone widening in the direction away from the extension 12. In this case the cone angle preferably is approximately 10° or a little less, so that the surface area of the clamping section 26 includes an angle of no more than 5° in respect to the center axis M. The clamping section 26 is provided for receiving an exposed end 27 of the corrugated pipe 5. The axial length of the clamping section 26 is preferably of such a size that at least two to three ribs 6 find space on the surface area of the clamping section 26.

Figure 3:
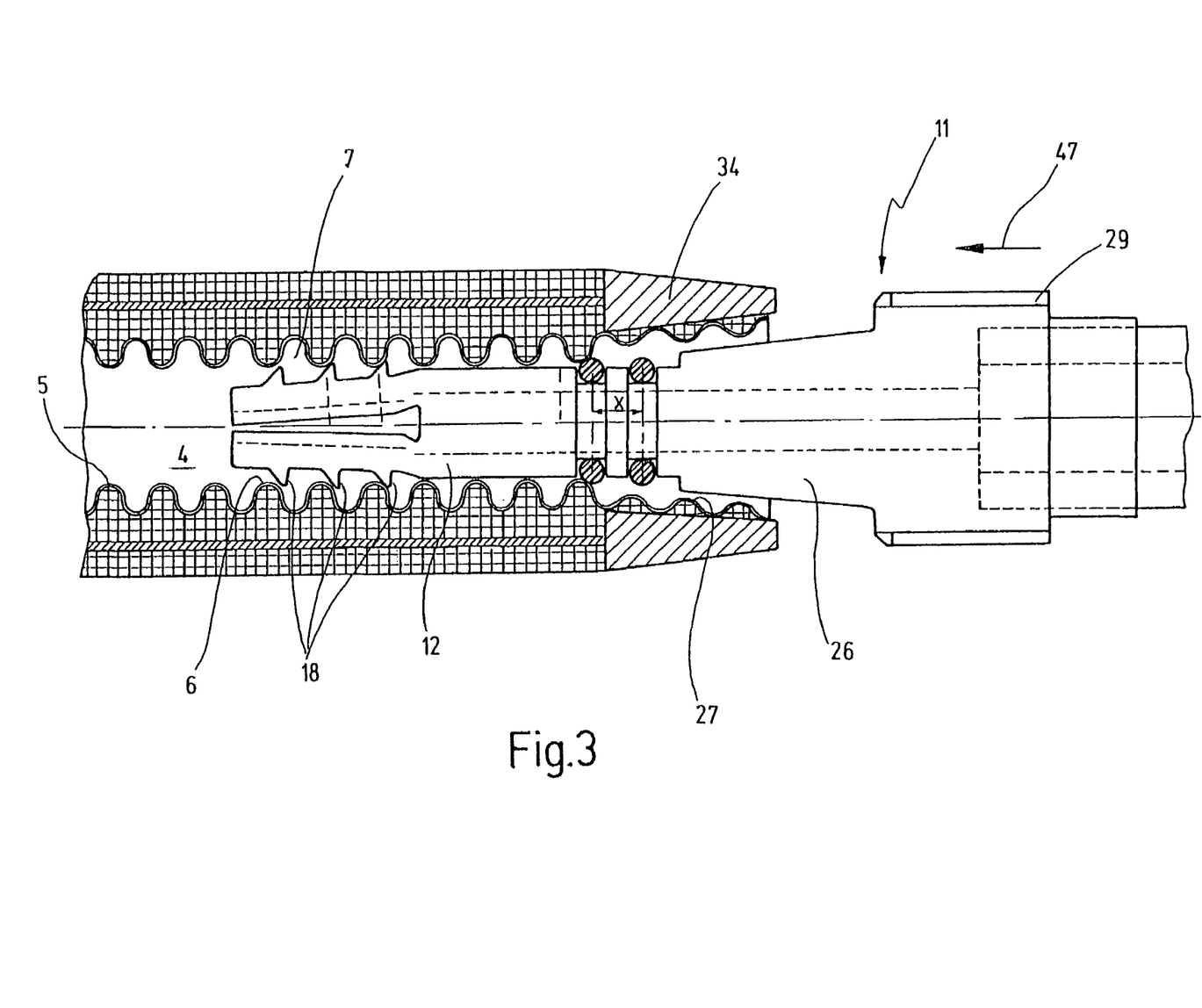
FIG. 3 is a partial cross-sectional view of the end of the flexible corrugated hose with the clamping element pushed on it and its end widened, in the course of inserting a connecting element.

A holding section 28 is formed on the connecting element 11 following the clamping section 26 and is provided with an exterior thread 29, which can be seen in particular in FIG. 3.

The end of the connecting element 11 located opposite the extension 12 is constituted by a hexagon 31, or some other extension provided with contact faces, which can be used for placing a tool for transferring a torque to the connecting element 11.

A central bore 32 passes through the connecting element 11 and terminates in the fluid channel 4 and to which a pipe 33 or any other conducting means can be connected.

Figure 2:
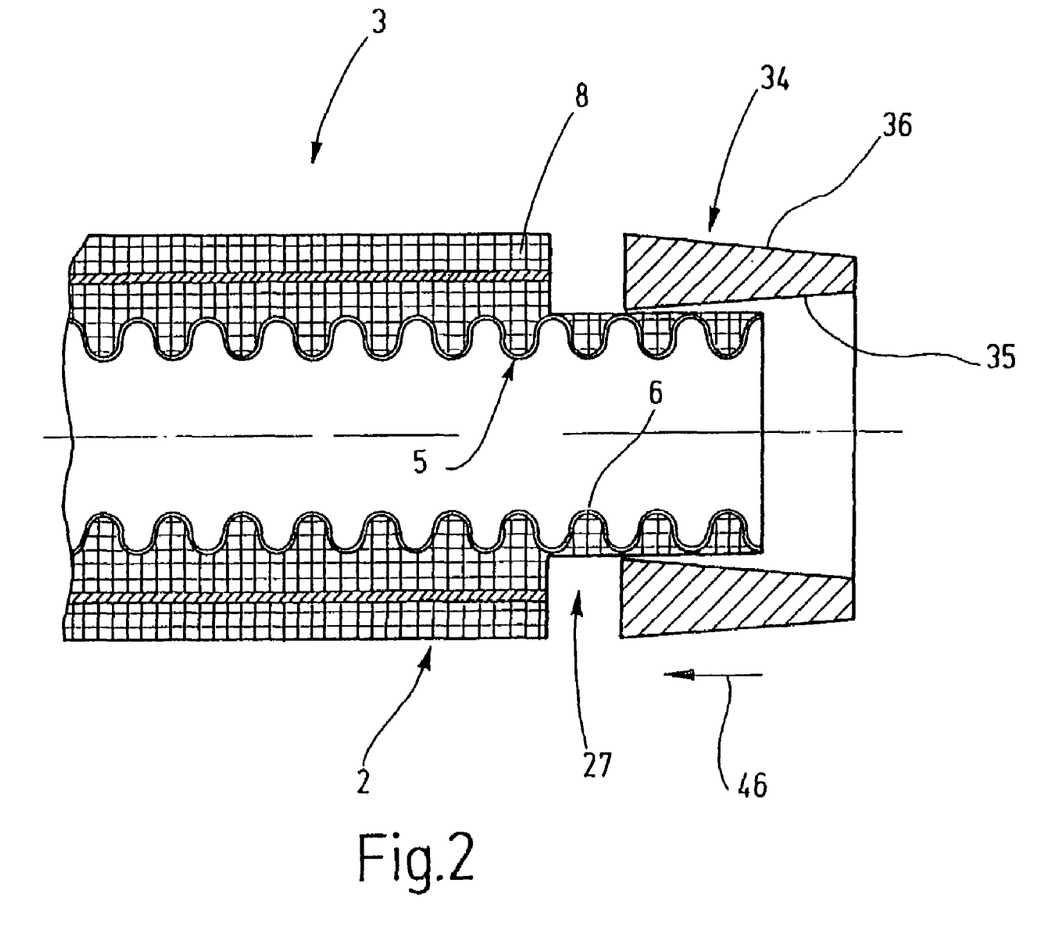
FIG. 2 is a partial cross-sectional view of the end of a flexible corrugated hose prepared for connection.

Moreover, a clamping element to be seen separately in FIG. 2, is a part of the flexible corrugated hose fitting and, in the exemplary embodiment, is formed by a squeeze ring 34. This squeeze ring 34 is made of metal, for example, and is of a length which essentially corresponds to the length of the end 27 and is slightly less than the clamping section 26. The squeeze ring 34 is designed as a double cone. It has a conical interior face 35, whose cone angle matches the cone angle of the clamping section 26. It furthermore has an exterior surface 36, which is also located on the envelope of a cone. The cone angle can be of the same size as the cone angle of the interior face 35, but it is oppositely oriented. As can be seen from FIG. 2 in particular, the squeeze ring 34 is given a wedge-shaped cross section. Its greatest radial thickness approximately corresponds to the thickness of the sheathing 8.

A pressing sleeve 38, whose length approximately corresponds to the sum of the length of the extension 12 of the clamping section 26 and the holding section 28, is a further element of the flexible corrugated hose fitting 1. The pressing sleeve 38 is designed to be approximately cylindrically, wherein the interior diameter of the pressing sleeve matches the exterior diameter of the flexible corrugated hose 3, and therefore the sheathing 8. The wall strength of the pressing sleeve 38 is of such a size that the pressing sleeve 38, made of metal, can be plastically deformed with the use of manageable force.

The pressing sleeve 38 has a hollow-cylindrical pressing section 39, whose length approximately corresponds to the length of the extension 12. A squeeze section 41 follows the pressing section 39 and has a conical interior surface 42. The latter can be separately seen in FIG. 4. The cone angle of the interior surface 42 matches the cone angle of the exterior surface 36 of the squeeze ring 34.

Following the squeeze section 41, the pressing sleeve 38 has a through-opening 44, which is provided with an interior thread 43, wherein the interior thread 43 matches the exterior thread 29 of the connecting element 11.

On its exterior, the pressing sleeve 38 is provided with contact faces for a tool, for example a hexagon, octagon or other prism 45, in order to be able to place a tool against the pressing sleeve 38 for exerting a torque on it.

To make a connection between the flexible corrugated hose fitting 1 and the flexible corrugated hose 3, the following procedure is followed:

As illustrated in FIG. 2, for preparing the connection, first a portion of the sheathing 8 is removed from the end 2 of the flexible corrugated hose 3. In the course of this the corrugated pipe 5 is exposed over the approximate length of three ribs 6. Material (elastomer) of the sheathing present in the ribs 6 remains. For example, the sheathing 8 can be removed with a grinding tool in a grinding process, or with a cutting tool. The end 2 is subsequently cleaned of dirt particles and grinding debris.

Now the squeeze ring 34 is pushed on the exposed end 27 of the end 2 of the corrugated pipe 3, as indicated by an arrow 46 in FIG. 2.

In a following step the end 27 can be conically widened by means of a suitable tool in order to prepare for the connecting element 11 being pushed in, or plugged in. If sufficient axial forces are exerted, the widening process can be omitted. In that case the end 27 is widened by the pushing effect of the clamping section 26. For pushing the connecting element 11 into the end 27, or 2, of the flexible corrugated hose 3, the connecting element 11 can be held in frictional connection on its sheathing 8, after which the connecting element 11 and the flexible corrugated hose 3 are moved in relation to each other.

The process method including the pre-widening of the end 27 is preferred, because there the O-rings 23, 24 need only slide over two ribs 6. Therefore no damage on account of the roughness of the ribs 6 need be expected.

Figure 4:
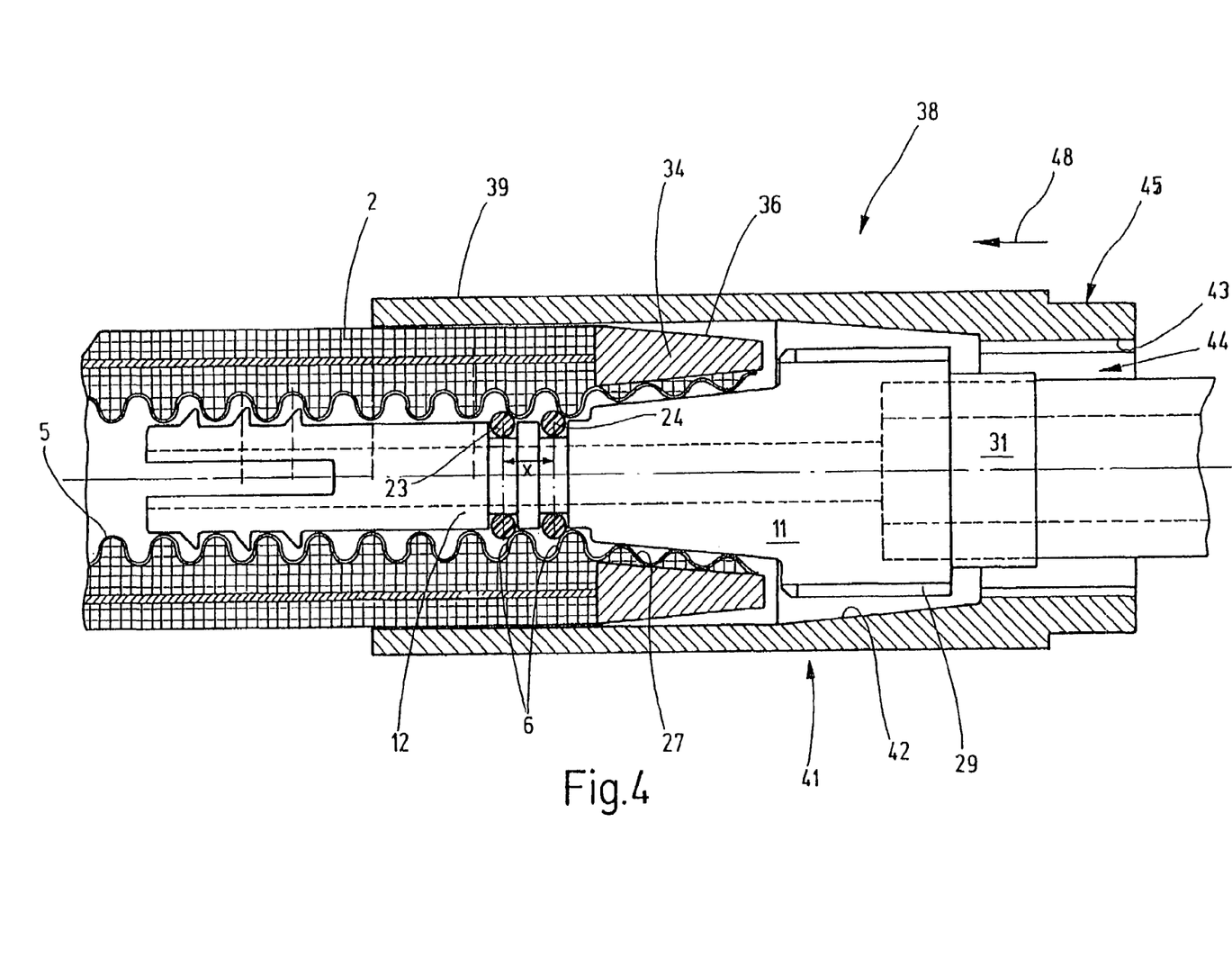
FIG. 4 is a partial cross-sectional view of the end of the flexible corrugated hose with the shoulder element pushed in and the pressing sleeve partially pushed on prior to the pressing operation.

FIG. 3 illustrates the insertion process of the connecting element 11. The extension 12 makes its way into the fluid channel 4 of the corrugated pipe 5, wherein the exposed fingers of the extension 12 supporting the snap-in ribs 18 are deflected radially toward the interior in order to slide over the ribs 6 and to snap into the wave troughs 7. The insertion process is finished when the clamping section 26 rests firmly against the widened end 27 of the corrugated pipe 5 in the interior and cannot be pushed in further. This state is illustrated in FIG. 4. Now the O-rings 23, 24, which were pushed into the corrugated pipe 5 together with the extension 12, rest against the ribs 6. If the widening is provided by pushing the connecting element in, the insertion process is finished when the end 27 is completely seated on the clamping section 26.

To finish the connection, the pressing sleeve 38 is pushed on the connecting element 11 and the end 2, as also represented in FIG. 4 and indicated by an arrow 48. In the course of this the pressing section 39 of the pressing sleeve 38 makes its way of the surface area of the sheathing 8. With continued pushing-on of the pressing sleeve 38, the exterior thread 29 and the interior thread 43 come into engagement. The pressing sleeve 38 can initially be further screwed on manually until the interior surface 42 rests against the exterior surface of the squeeze ring 34. In this state the hexagon 31 protrudes into the through-opening 44 and is therefore accessible.

Now a first tool, for example a wrench, is placed on the hexagon 31, and a second wrench on the prism 45. In the course of tightening the screw connection, care is preferably taken to see that the connecting element 11 is not twisted in respect to the flexible corrugated hose 3. In addition, the frictional connection between the end 27 of the flexible corrugated hose 3 and the clamping section 26 of the connecting element 11 prevents such a relative rotation. Because of this, every relative movement between the O-rings 23, 24 and the corrugated pipe 5 is prevented. Thus, a weld seam on the corrugated pipe 5 has no damaging effect on the O-rings 23, 24.

The O-rings 23, 24 are preferably arranged in such a way that they rest against the first two ribs 6 which immediately adjoin the funnel-shaped end 27. In this way an assembly which is easy on the material is possible—the O-rings need only slide over a few ribs.

In the course of tightening the screw connection between the connecting element 11 and the pressing sleeve 38, a slight axial movement is caused between the squeeze ring and the pressing sleeve 38, because of which the squeeze ring 34 is pressed in, and is possibly pressed radially inward against the end 27 of the corrugated pipe 5. In this way the end 27 can be pressed together with the clamping section 26.

For the final complete securing of the connection between the flexible corrugated hose fitting 1 and the flexible corrugated hose, the pressing section 39 of the pressing sleeve 38 is radially deformed toward the inside by the effect of appropriate forces F, as represented in FIG. 1. The forces F are applied to an area of the surface of the pressing sleeve 38 in which ribs 6 are located. The forces are applied to the pressing sleeve 38 in spots, or in a corresponding annular area, distributed over its circumference. By a concentration in an area in which the ribs 6 are located, the uncontrolled deformation of the corrugated pipe 5 is prevented. Instead, the rib 6 is supported without a deformation worth mentioning on the cylindrical surface area 14 of the extension 11 and can here provide an additional metallic seal.

Figure 5:
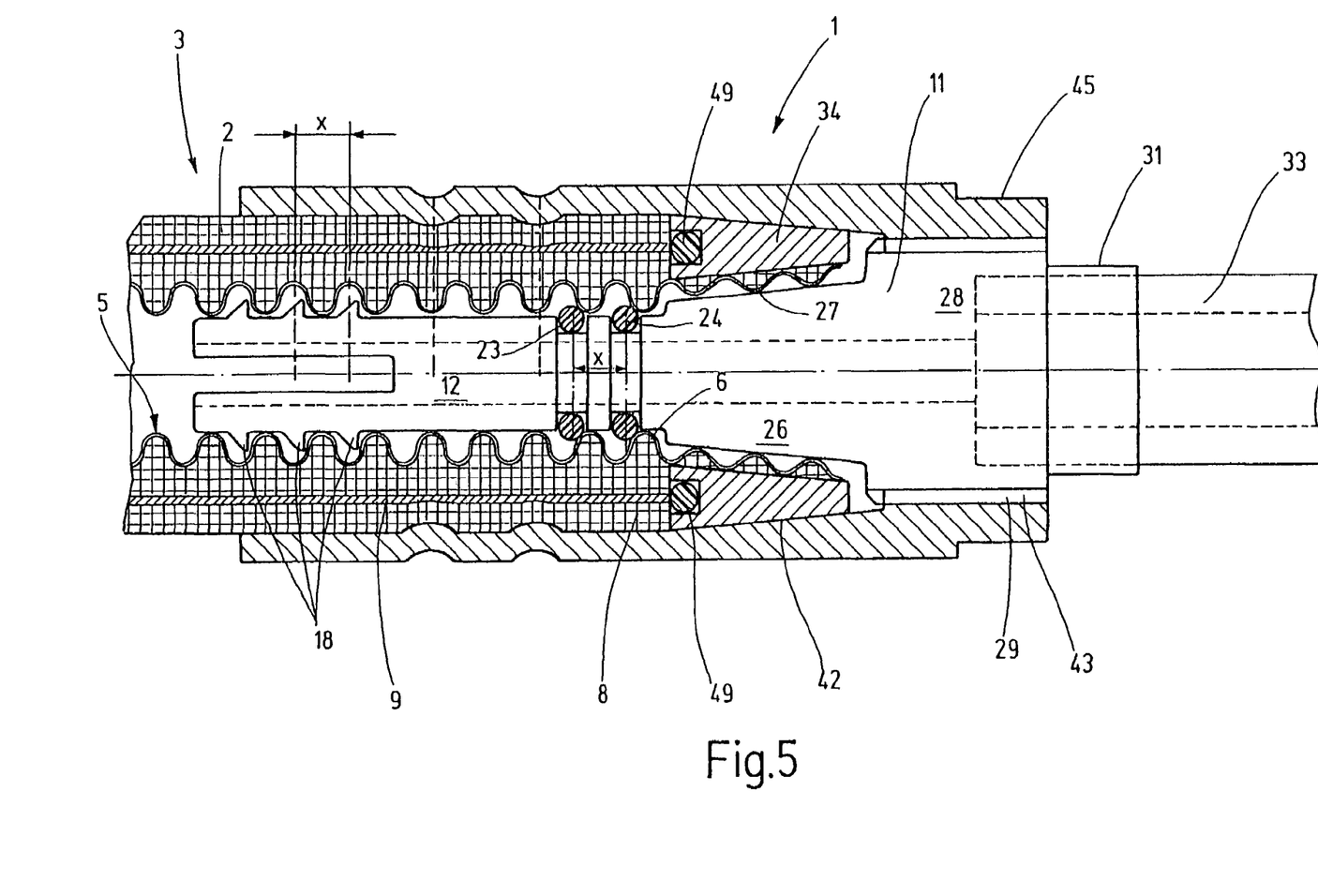
FIG. 5 is a partial cross-sectional view of the end of a flexible corrugated hose with a flexible corrugated hose fitting having a changed clamping element.

A variation of an embodiment of the flexible corrugated hose fitting 1 is illustrated in FIG. 5. It differs from the above described flexible corrugated hose fitting merely by the embodiments of the squeezing ring 34. The latter is provided on its side facing the sheathing 8 with an annular groove, which is open in the axial direction and houses an O-ring 49. The latter rests against the front face of the sheathing 8 and is used for additional sealing. Otherwise, reference is made to the above description.

A flexible corrugated hose fitting 1, which is particularly provided for high-pressure installations, such as airconditioning installations using $CO_2$ as the refrigerant, has a connecting element 11, which can be snapped together with the interior corrugated pipe 5 of the flexible corrugated hose 3. In addition, the connecting element 11 has sealing elements 23, 24, which come into sealing contact with the corrugated pipe 5. Following the area receiving the sealing elements 23, 24, the connecting element 11 has a cone 26, which is used as a clamping section. An exterior squeeze ring 34, or other squeeze element, is used for pressing the exposed end of the corrugated pipe against the clamping section 26. A pressing sleeve 38 is used for pressing, which drives the squeeze ring 36 by a wedge effect inward. It has an appropriate conical interior surface 42. The squeeze ring 34 moreover extends over the sheathing 8. For further securing of the connection, the pressing sleeve can be pressed together here with the sheathing 8 by an appropriate deformation. The pressing sleeve 38 can alternatively be provided with an interior thread in this area, which cuts into the sheathing 8.

What is claimed is:

1. A flexible corrugated hose fitting for flexible corrugated hoses having a corrugated pipe and a sheathing, the fitting comprising:
   a connecting element with an extension, which can be pushed into the corrugated tube, a clamping section adjoining the extension for receiving an exposed end of the corrugated pipe and a holding section,
   a fastening device provided on the extension for the axial securing of the corrugated pipe, having a clamping element, which can be pushed on the end of the corrugated pipe, and
   a pressing sleeve, which can be connected with the holding section of the connecting element, and which has a pipe-shaped section extending to the sheathing,
   wherein the extension is embodied in a pipe shape and has an essentially cylindrical outer surface, wherein the fastening device is a snap-in device, part of which are one or several snap-in protrusions, which are sawtooth-shaped in longitudinal section and are arranged on the exterior surface of the extension wherein, when several snap-in protrusions are provided,
   which are axially spaced apart from each other, the axial distance (x) between the snap-in protrusions matches the wave distance (x) of the corrugated pipe, or is a whole number multiple thereof, and wherein, the extension has at least one axial slit for making possible a radial movement of the areas of the extension supporting the snap-in protrusions.

2. The flexible corrugated hose fitting in accordance with claim 1, wherein the snap-in protrusions are ring-shaped snap-in-ribs.

3. The flexible corrugated hose fitting in accordance with claim 1, wherein the extension and/or the clamping element are provided with at least one sealing element for sealing against the corrugated pipe or the flexible corrugated hose.

4. The flexible corrugated hose fitting in accordance with claim 3, wherein the sealing element is an elastomer element.

5. The flexible corrugated hose fitting in accordance with claim 4, wherein the elastomer element is an O-ring, which is received in an annular groove.

6. The flexible corrugated hose fitting in accordance with claim 3, wherein a distance of at least one wave length (x) of the corrugated pipe is provided between the sealing element and a snap-in device.

7. The flexible corrugated hose fitting in accordance with claim 1, wherein the axial distance between a sealing element and a snap-in protrusion is a multiple of the wave length (x) of the corrugated pipe plus a fraction (1/y) of the wave length (x).

8. The flexible corrugated hose fitting in accordance with claim 7, wherein the fraction (1/y) lies in the range between a quarter (1/4) up to a third (1/3).

9. The flexible corrugated hose fitting in accordance with claim 1, wherein the clamping section is a cone section of the connecting element.

10. The flexible corrugated hose fitting in accordance with claim 9, wherein the cone section has such a cone angle that its exterior surface is inclined at no more than 5° against the axial direction.

11. The flexible corrugated hose fitting in accordance with claim 1, wherein the clamping element has an interior shape which is matched to the exterior shape of the clamping area of the connecting element.

12. The flexible corrugated hose fitting in accordance with claim 1, wherein the clamping element has an exterior shape which is matched to the interior shape of the pressing sleeve.

13. The flexible corrugated hose fitting in accordance with claim 1, wherein a clamping element is a conical ring.

14. The flexible corrugated hose fitting in accordance with claim 1, wherein the clamping element is provided with a sealing element, which is to be clamped in the axial direction.

15. The flexible corrugated hose fitting in accordance with claim 1, wherein the holding section of the connecting element has an exterior thread to which an interior thread of the pressing sleeve is assigned.

16. The flexible corrugated hose fitting in accordance with claim 1, wherein on its interior the pressing sleeve has a conical seat, which matches the exterior shape of the clamping element.

17. The flexible corrugated hose fitting in accordance with claim 1, wherein the pressing sleeve has a pressing section which is fixedly arranged at a location of the corrugated pipe where the corrugated pipe has a local minimum diameter.

18. The flexible corrugated hose fitting in accordance with claim 1, wherein a distance of at least one wave length (x) of the corrugated pipe is provided between the sealing element and the snap-in device.

19. The flexible corrugated hose fitting in accordance with claim 1, wherein the fastening device is a snap-in device configured to be snapped into the corrugated pipe as the fastening device is pushed therein.

20. A method for connecting a flexible corrugated hose, having an interior corrugated pipe and a sheathing, to a flexible corrugated hose fitting including a connecting element with an extension, which can be pushed into the corrugated tube, a clamping section adjoining the extension for receiving an exposed end of the corrugated pipe and a holding section, a fastening device provided on the extension for the axial securing of the corrugated pipe, having a clamping element, which can be pushed on the end of the corrugated pipe, and a pressing sleeve, which can be connected with the holding section of the connecting element, and which has a pipe-shaped section extending to the sheathing, the method comprising the steps of:

cutting the flexible corrugated hose to size;

removing the sheathing at the end of the flexible corrugated hose, which is to be connected, to a length corresponding to the length of the clamping section of the flexible corrugated hose fitting;

placing the clamping element on the end of the flexible corrugated hose from which the sheathing has been removed;

inserting the extension of the connecting element into the end of the flexible corrugated hose;

pushing the pressing sleeve on the end of the sheathing;

connecting the pressing sleeve with the connecting element; and pressing the pressing element together with the flexible corrugated hose.

* * * * *